H., J. H. & H. H. Ehrman,
Washing Machine.
Nº 28,566. Patented June 5, 1860.
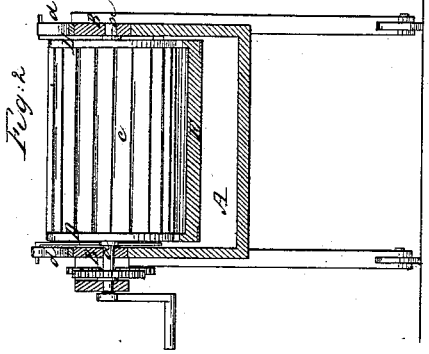
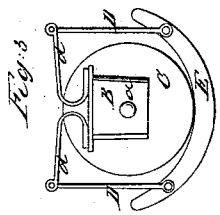
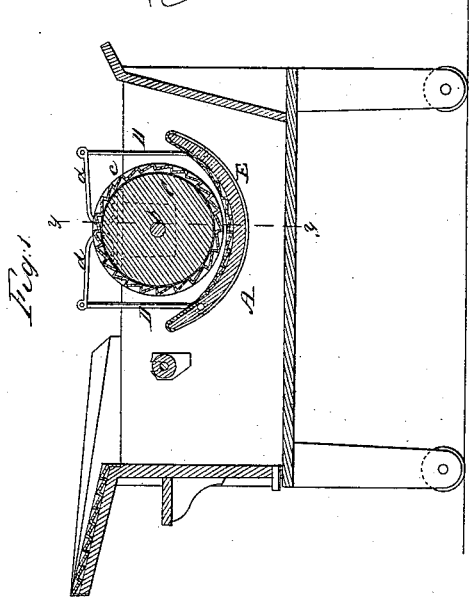
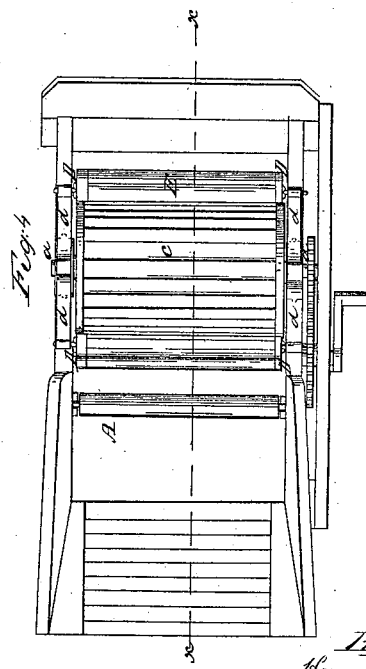
Witnesses
J. W. Coombs
R. S. Spencer
Inventor
Henry Ehrman,
Jos H Ehrman,
H H Ehrman,
per Munn & Co Attorney

UNITED STATES PATENT OFFICE.

HENRY EHRMAN, JOSEPH H. EHRMAN, AND HENRY H. EHRMAN, OF ANNVILLE, PENNSYLVANIA.

WASHING-MACHINE.

Specification of Letters Patent No. 28,566, dated June 5, 1860.

*To all whom it may concern:*

Be it known that we, HENRY EHRMAN, JOSH. H. EHRMAN, and HENRY H. EHRMAN, all of Annville, in the county of Lebanon and State of Pennsylvania, have invented a new and Improved Clothes-Washing Machine; and we do hereby declare that the following is a full, clear, and exact description of the same, reference being had to the annexed drawings, making a part of this specification, in which—

Figure 1, is a side sectional view of our invention taken in the line $x$, $x$, Fig. 4. Fig. 2, a transverse vertical section of the same, taken in the line $y$, $y$, Fig. 1. Fig. 3, a detached end view of the corrugated cylinder concave and springs. Fig. 4, a plan or top view of the whole machine.

Similar letters of reference indicate corresponding parts in the several figures.

To enable those skilled in the art to fully understand and construct our invention, we will proceed to describe it.

A represents a box which may be of rectangular or other suitable form and having the bearings or journal boxes B, B, fitted in its sides, said bearings being allowed to slide freely in and out of the sides. In the bearings B, B, the journales $a$, $a$, of the shaft $b$, of a cylinder C, are fitted. This cylinder may be of wood covered with corrugated sheet metal $c$, or, it may be corrugated in any other way. To each bearing B, two springs $d$, $d$ are attached. These springs may be constructed of flat strips of steel, curved so as to project over and beyond the sides of the bearings as shown clearly in Fig. 3. To the end of each spring $d$, a pendent rod D, is attached, and to the lower ends of these rods D, the concave E, is secured. The concave may be constructed in any of the known ways, and is corrugated on its upper surface.

From the above description it will be seen that the cylinder, concave and springs are all connected, the springs $d$, $d$, being attached to the bearings B, B, in connection with the rods D, forming the connection. It will also be seen that as the bearings B, may be readily fitted into, and removed from the box A, the cylinder C, with its concave may be fitted into and removed from the box and the latter used as the rinsing box. It may also when necessary be thoroughly cleansed without difficulty, as all parts of it, by the removal of the cylinder and concave, are perfectly accessible. The within described invention also admits of the ready adaptation of the cylinder and concave to the box, and considerably simplifies the construction of the machine, and the repairing of the same when necessary.

We wish it to be distinctly understood that we do not claim broadly a rotating corrugated cylinder and yielding concave, for such parts form an old, and well known device for the washing of clothes; but, We do claim, as new and desire to secure by Letters Patent—

The combination of the journal boxes or bearings B, B, with the concave E, springs $d$, and rods D, as herein shown and described so that the said bearings, rubbing cylinder, concave and springs may be all simultaneously removed as set forth.

HENRY EHRMAN.
JOSEPH H. EHRMAN.
HENRY H. EHRMAN.

Witnesses:
HENRY FISHER,
JOHN B. GNEESIG,
ADAM IMBODEN.